Dec. 15, 1931.  A. H. LYON  1,837,054
MACHINE TOOL
Filed July 26, 1929  4 Sheets-Sheet 1
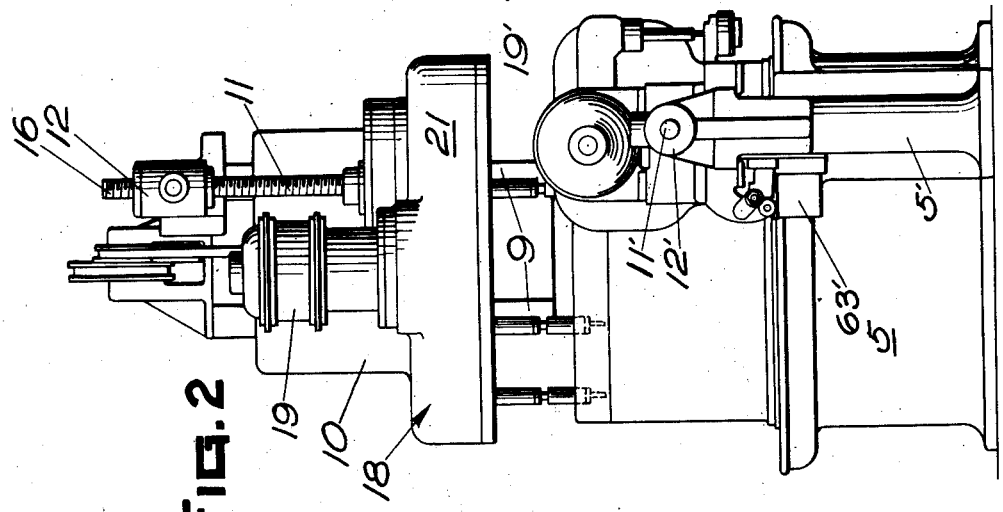
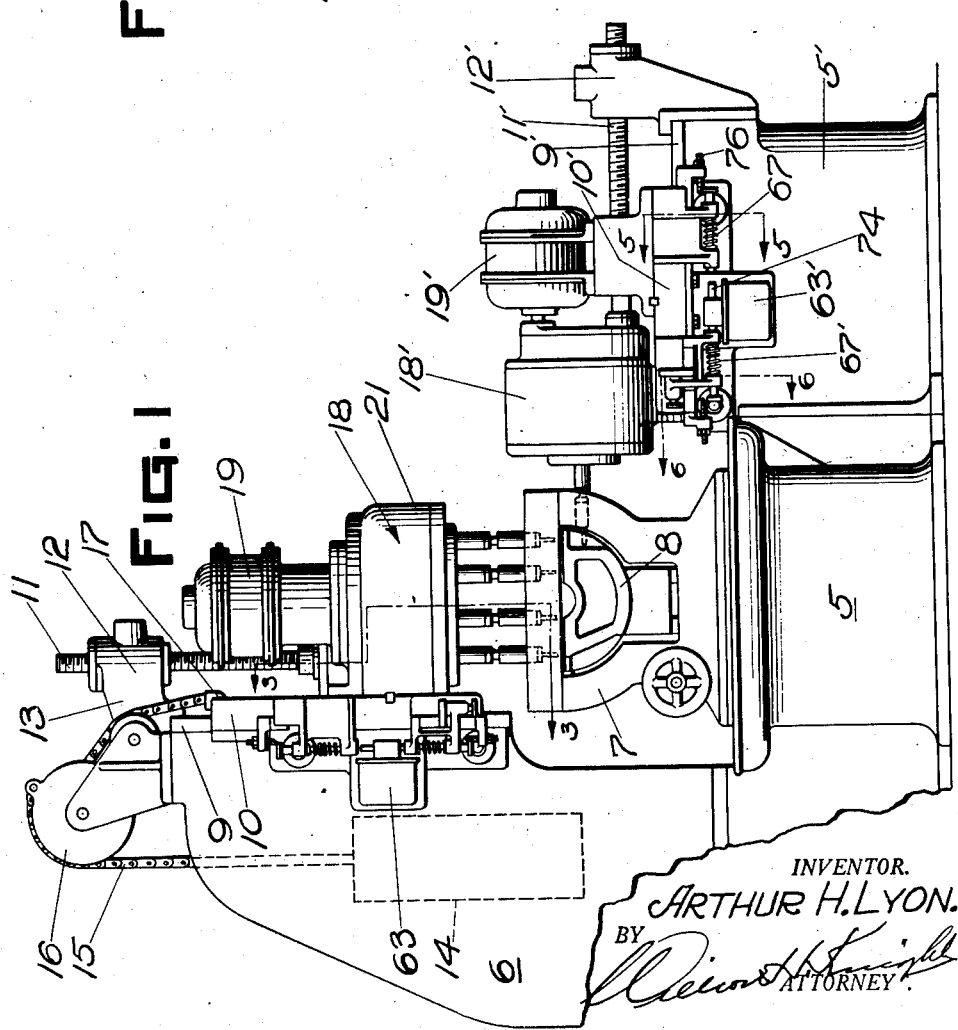
INVENTOR.
ARTHUR H. LYON.
BY
ATTORNEY.

Dec. 15, 1931. A. H. LYON 1,837,054
MACHINE TOOL
Filed July 26, 1929 4 Sheets-Sheet 2
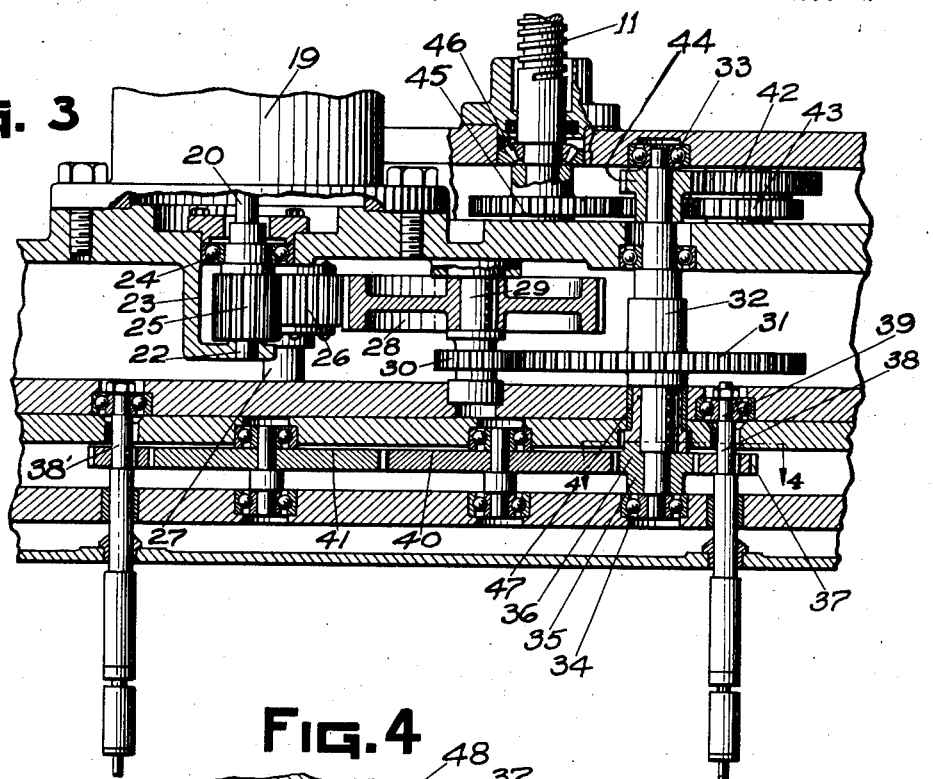
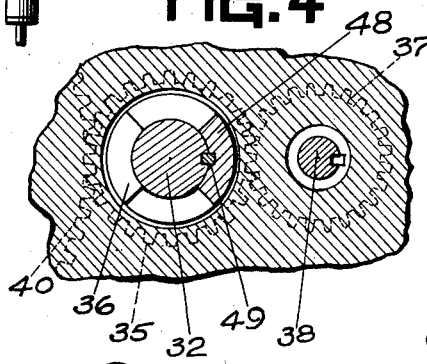
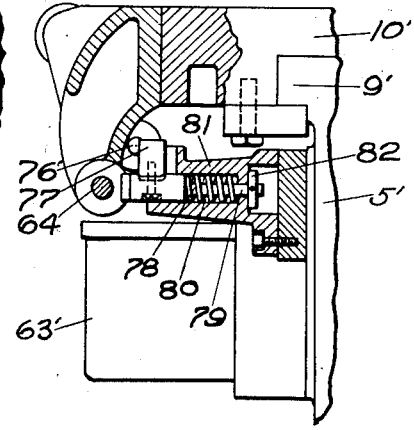
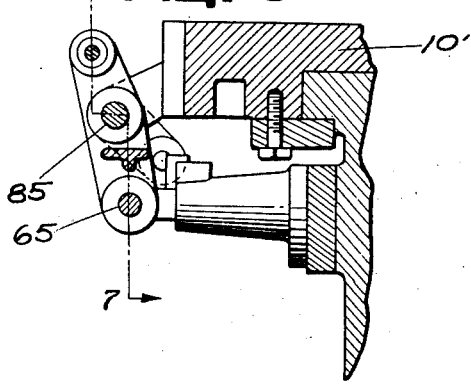
INVENTOR.
ARTHUR H. LYON
BY
ATTORNEY.

Dec. 15, 1931. A. H. LYON 1,837,054
MACHINE TOOL
Filed July 26, 1929 4 Sheets-Sheet 3

INVENTOR.
ARTHUR H. LYON
BY
ATTORNEY.

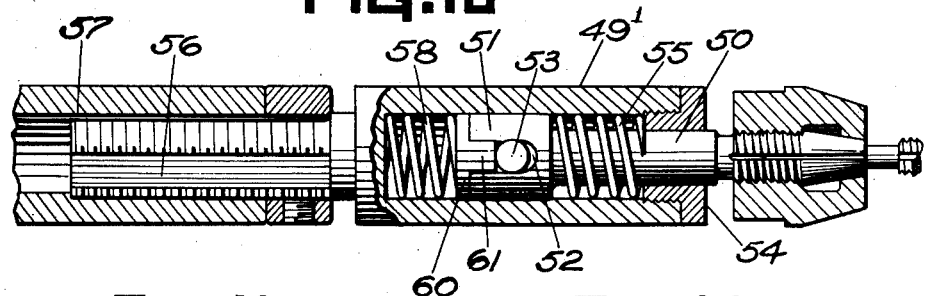
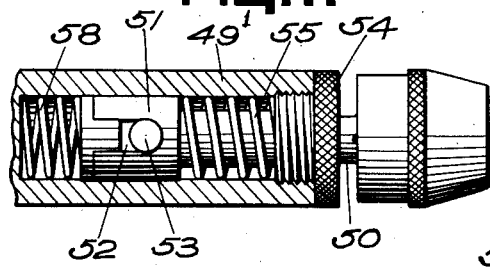
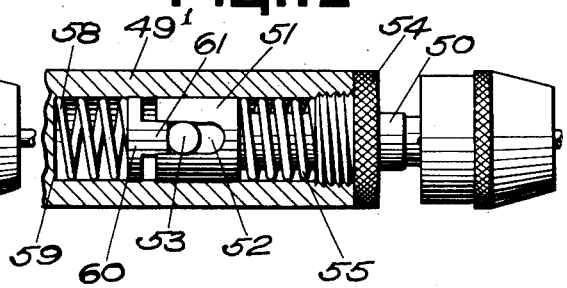
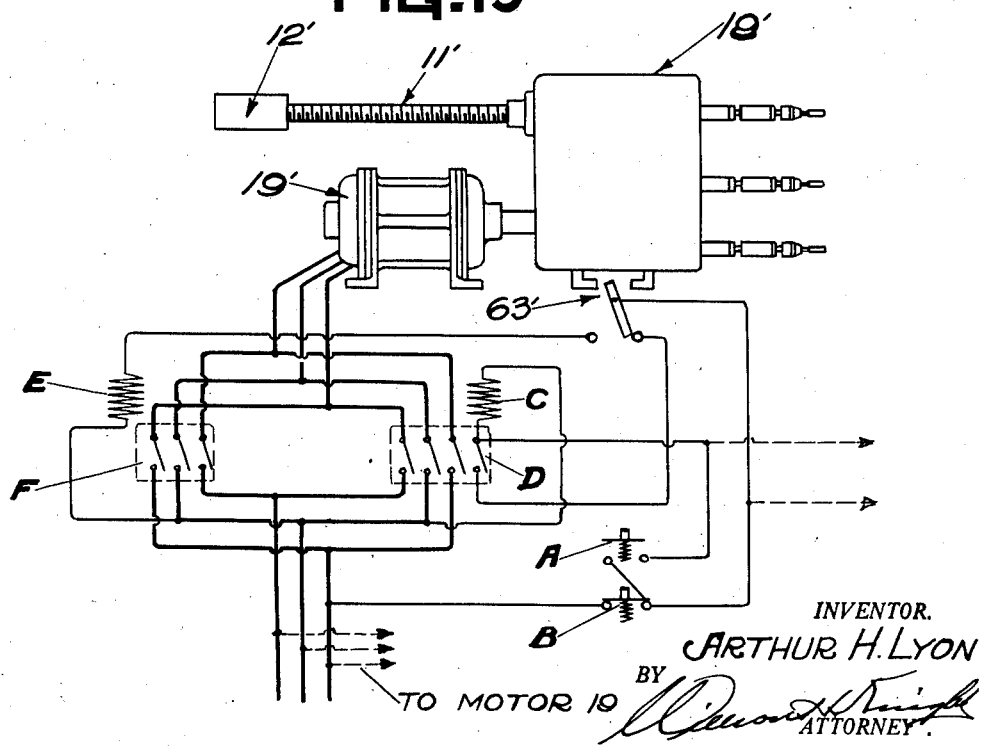

Patented Dec. 15, 1931

1,837,054

UNITED STATES PATENT OFFICE

ARTHUR H. LYON, OF ROCKFORD, ILLINOIS, ASSIGNOR TO THE INGERSOLL MILLING MACHINE COMPANY, OF ROCKFORD, ILLINOIS, A CORPORATION OF ILLINOIS

MACHINE TOOL

Application filed July 26, 1929. Serial No. 381,156.

The present invention relates in general to machine tools and has particular reference to an improvement in tapping machines of the power driven multiple type.

To better explain the salient features of the invention, it will be recalled that prior to the introduction of the present improvements considerable difficulty had been experienced in the operation of multiple spindle tapping machines due primarily to the frequent destruction of the threads at the edge of the hole as a result of one or more of the tools finishing its backing up feed ahead of the others. With all of the tools collectively assembled in the head, the head could not be moved to clear the tools from the work until each and every one of the tools had completed its cycle of operation. This would leave those tools which finished ahead of others continuing to rotate at the edge of the tapped thread and in wiping contact therewith.

The principal object of this invention is to provide means for automatically clearing each tool from the work instantly as it completes its backing up feed so that those tools which finish ahead of the others will in no way injure the threads they tap by continued rotation in the edge of the hole.

Other objects of the invention will appear hereinafter, the novel features and combinations being set forth in the appended claims.

Obviously, those skilled in the art may make various changes in the construction of the mechanism and the specific method described without departing from the spirit and scope of the invention as defined by the subjoined claims, and I therefore do not wish to be limited to the precise embodiment shown.

The particular embodiment shown in the accompanying drawings is an automatic mechanical control adaptation of the invention. In my copending application Serial No. 379,737 filed July 20, 1929, I have shown and described an electrical control for accomplishing the same objective.

In the accompanying four sheets of drawings, Figure 1 is a view in side elevation of a tapping machine embodying the characteristics of my invention.

Fig. 2 is a view in end elevation of the machine.

Fig. 3 is a view in vertical section taken on the line 3—3 Fig. 1.

Fig. 4 is a detail view in cross-section taken on the line 4—4 Fig. 3.

Fig. 5 is a detail view in vertical section taken on the line 5—5 Fig. 1 and showing a detail of the limit switch mechanism.

Fig. 6 is a detail view in vertical section taken on the line 6—6 Fig. 1 showing another detail of the limit switch mechanism.

Fig. 10 is a detail view in longitudinal section of the tool unit assembly and showing the parts thereof in normal inactive position.

Fig. 11 is a detail view in longitudinal section of the tool unit assembly showing the position of the parts when the tool is performing the tapping half of the operating cycle.

Fig. 12 is a view similar to Fig. 11 but showing the position of the parts when the tool is backing out of the work, and Fig. 13 is a schematic view of the wiring diagram.

Figure 7:
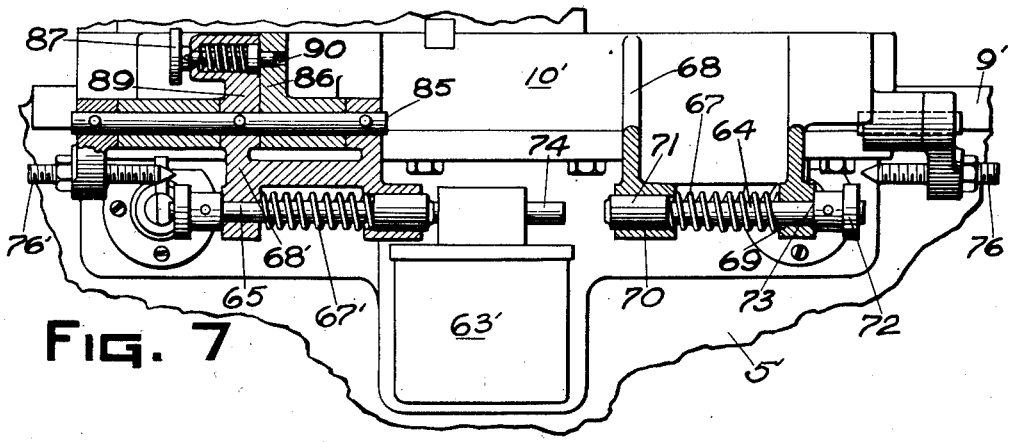
Fig. 7 is a view in section taken on the line 7—7 Fig. 6.

Referring now to the drawings in detail, the machine includes a frame structure having a work-supporting base 5 to one side of which is formed the housing 6. The embodiment of the present invention which has been selected for illustration is a combined vertical and horizontal tapping machine in which the tools are so arranged that holes located at right angles to one another may be tapped simultaneously. To provide for this feature, the bed 5 is provided with a fixture 7 for holding the work 8 to be tapped. Provided on the side of the housing 6 are slideways 9 on which the tool carriage 10 is slidably mounted for vertical reciprocation. As is customary with machines of this general type, the carriage 10 is reciprocated by means of a feed screw 11 which is threaded through a feed nut 12. In this particular instance, the feed nut 12 is supported in coaxial alignment with the feed screw 11 by means of a bracket 13 which projects from the top of the housing 6 just above the slideways 9. To properly counterbalance the vertical reciprocation of the carriage, a weight 14 is suspended by means of the chain 15, the chain 15 passing over the differential pulleys 16 with its extremity fixed as at 17 to the carriage.

Mounted on the carriage 10 is a tool head 18 and an electric motor 19. By referring to Fig. 3, it will be seen that the shaft 20 of the motor 19 extends into the elongated gear box 21 of the head for the reduction gearing and with its end journalled, as at 22, in a bearing made to receive it in the end of the downwardly depending part 23 of the gear box. A ball bearing assembly 24 is provided for the shaft 20 and between the bearing 24 and the bearing 22 is a driving pinion 25 which is fixed to rotate with the shaft 20. This pinion 25 is in constant mesh with an idler spur gear 26 which is carried by the idler shaft 27. The shaft 27 is properly journalled in the gear box and the gear 26 is in constant mesh with the gear 28 of larger diameter and which is mounted upon an idler shaft 29. Carried on the shaft 29 coaxial of the gear 28 is a spur gear 30 which is in constant mesh with a larger gear 31 carried by the stepped shaft 32. The shaft 32 is driven by the gear 31 and the same is journalled at its opposite ends in anti-friction bearings 33 and 34. Loosely mounted on the lower end of this shaft 32 is a driving gear 35 which has an upstanding lug segment 36 on its top surface to form one part of a clutching device to be hereinafter more fully explained. This gear 35, as stated, is loosely mounted on the shaft 32 and is in constant mesh with the driven gear 37 which is fixed on the spindle 38 for the tool unit assembly. The spindle 38 for each tool unit is properly mounted in anti-friction bearings 39 at one end with its opposite end projecting through the gear box carrying the customary chuck and collet. Aside from the anti-friction bearings 39 in which the spindles 38 are mounted, the tool is properly guided at spaced intervals in its length so as to provide a practical and mechanically sound assembly. It will, of course, be understood that the gear system which is employed for driving the tools is arranged to provide the necessary reduction as well as to arrange for all of the tools to rotate in the same direction and at the same rate of rotation. This accounts for the idler gears 40 and 41 which transmit a drive to the other tools in the head, as, for example, the tool spindle 38' which is mounted parallel to the first-referred-to spool.

Driven also off the shaft 32 by means of the gear train comprising the gears 42, 43, 44 and 45 is the feed screw 11. This screw is mounted, as at 46, to the top of the gear box and, as shown in Fig. 1, extends vertically through the feed nut 12.

Mounted upon the shaft 32 immediately above the gear 35 is a sleeve 47 which is made with a lug segment 48 as a mate for the lug segment 36 on the gear 35. The lug segment 48 is formed as an integral part of the sleeve 47, and the sleeve, in turn, is keyed, as at 49, to the shaft 32. With this clutching device it will readily be seen that the shaft 32 will make approximately one-half of a turn before the lug 48 will engage the lug 36 on the gear 35 and at which time the gear 35 will be connected in driving relation with the shaft 32. Before the engagement of the lugs 48 and 36, rotation of the shaft 32 this one half turn will not drive the gear 35. The purpose of this clutching mechanism is to cause the carriage to be elevated before rotation of the tools is effected.

By referring to Figs. 10-12, inclusive, it will be seen that each tool assembly includes a barrel part 49¹ in which the collet 50 is mounted for limited axial movement. The collet carries an enlarged diameter 51 on its end which is slotted, as at 52, for the reception of a cross pin 53 carried by the barrel 49. The threaded plug 54 through which the collet enters the internal bore of the barrel 49 provides an abutment for one end of a spring 55 which is coiled around the collet, and the shoulder of the enlarged diameter 51 provides an abutment for the opposite end of this spring. The spring is coiled to normally hold the collet at approximately the limit of its axial movement inwardly of the barrel so that any axial pull on the tool in a direction away from the barrel 49 will tension the spring 55, and when this pull is released, the spring 55 will retract the collet and pull the tool toward the barrel. The spring thus provides a retracting tension for the tool and serves as a recoil device so that when any one of the plurality of tools finishes its backing up half of the tapping cycle, it will be immediately kicked back or snapped back away from the work, clearing the same so that it will not continue to rotate in the tapped hole waiting for the other tools to finish the backing up operation, and in doing so, destroying the tapped thread.

The clutching device between the shaft 32 and the gear 35 is a mechanical contrivance for collectively applying this retracting tension to all of the tools so that each tool may be individually cleared of the work. In operation, it will be readily appreciated that when the motor 19 is reversed, after the tapping half of the cycle and the feed screw 11 is reversed as a result of the reversal of the motor, the carriage will be lifted. The lug segments 48 and 36 will be at diametrically opposed positions. At the time this reversal takes place the tools will not be reversed for approximately one half turn of the shaft 32. This causes a limited elevation of the carriage, and consequently a pull on the barrels 49 of the tools which develops an initial maximum tension in the springs 55. Then, just as soon as the carriage has been elevated to the limit of its upward travel, the tools will automatically snap away from the work as they are released.

The barrels 49 of each of the tool segments carry a shank 56 which is keyed in the part 57 on which the spindles of the tools are mounted. To cushion the tapping operation of the tools, each of the barrels 49 is provided with a coil spring 58 which is confined in the bore of the barrel between the closed end 59. Button 60 is slidably mounted in the bore of the barrel and has a tongue part 61 which fits the slot 52 and in which it slides back and forth in back of the pin 53. The maximum stiffness of the spring 58 should always exceed the maximum resistance which the tools encounter in tapping the work.

In effecting the tapping operation, the motor is started by a suitable starting switch and the feed screw slowly lowers the carriage until the tools come into contact with the work, whereupon the tapping operation commences. A suitable limit switch, which will be later described in detail, reverses the motor at the end of the tapping half of the operating cycle and also at the end of the backing up half of the cycle.

The horizontal tools are constructed to operate substantially the same as the vertical tools, the same being supported by a bed structure 5' on which the carriage 10' is mounted for reciprocation upon the ways 9' by means of the feed screw 11'. The carriage 10' carries the tool head 18' for the plurality of tools and a motor 19' is used as the prime mover for the unit. The feed nut 12' coacts with the feed screw 11' for effecting the reciprocation of the carriage and the tools carried thereby.

The horizontal bank of tools and the vertical bank are preferably timed to operate in synchronism. For this reason the actuating mechanism for the limit switch 63 is adjusted to correspond with the actuating mechanism for the limit switch 63. Of course this need not be the case in every instance as one bank of tools may be timed differently than the other. The reduction gearing in the head 18' may be geared the same as the system explained for the head 18 in any event the same type dog clutch is preferably employed to co-operate with the feed screw and spring assembly for tensioning the horizontal tools in order that they too may be retracted automatically at the completion of their backing up operation.

The limit switches 63 and 63' for the vertical and horizontal tool banks respectively may be purchased on the open market the same being known to the trade as a G. E. limit switch. Since both of the switches as well as their respective actuating mechanisms are identical in construction and operation with the exception that one is disposed vertically and the other horizontally, it will be necessary to describe only the details of one.

For this reason the horizontal unit has been selected for explaining the function of the switch and the corresponding parts in the vertical assembly will bear corresponding reference numbers. The mechanism which actuates the switch is carried by the carriage 10' and comprises a pair of opposed push rods 64 and 65 around which are coiled springs 67 and 67' respectively. The rods 64 and 65 are both supported from the side of the carriage 10' by depending a hanger 68 for the rod 64 and a somewhat different arrangement for the rod 65.

Figure 8:
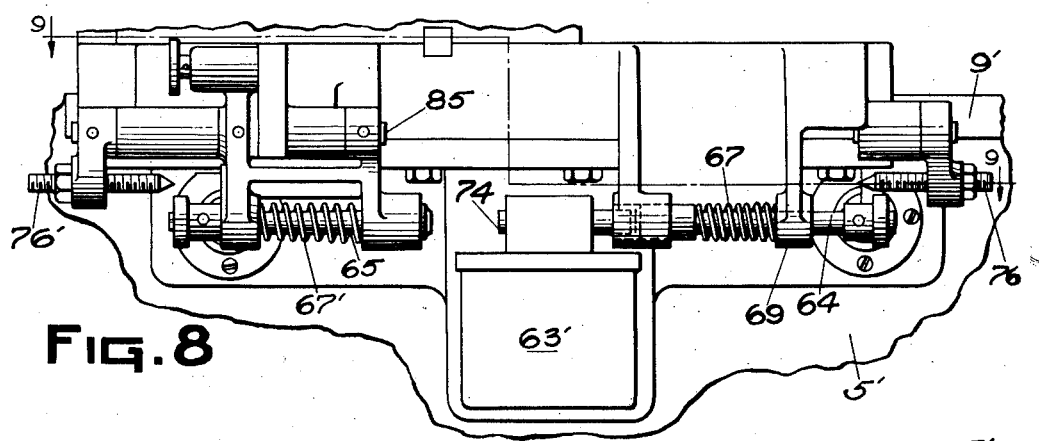
Fig. 8 is a view similar to Fig. 7 but showing the limit switch mechanism in opposite active operating position.
Figure 9:
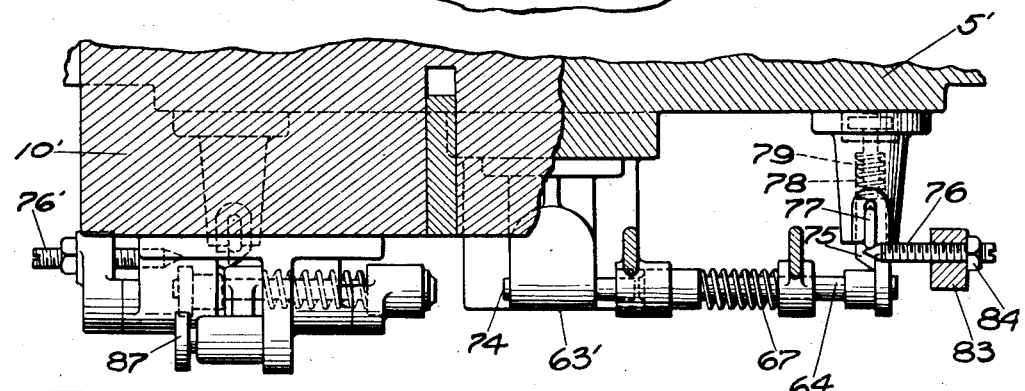
Fig. 9 is a view in section taken on the line 9—9 Fig. 8.

Describing first the hanger 68 it will be seen that it provides spaced bearings 69 and 70 in which the rod 64 is journaled, the spring 67 being coiled around the rod between these two bearings. One end of the rod 64 is made with an enlarged diameter 71 and the opposite end carries a flanged head 72. The shoulder 73 on the head produces a stop on the rod 64 and prevents the same from moving toward the cross pin 74 on the limit switch. When the tapping tools reach the limit of the tapping half of the operating cycle, the carriage will have been moved into the position shown in Fig. 8, whereupon the limit switch will be tripped and the reverse or backing up half of the tapping cycle will commence. At the limit of both the tapping half and backing up half of the cycle the limit switch which is tripped by either the rod 64 or the rod 65, depending upon the position of the carriage. As the carriage commences to move the tools toward the work, the head 72 on the rod 64 abuts the latch 75, whereupon the movement of the rod is arrested, although the carriage continues to move forward. As the threaded trip pin 76 wipes against the upstanding block 77, the latch 75 is retracted and the rod 64 is released and the built-up tension in the spring 67 impels the rod against the cross pin 74 striking the same a hammer blow and snapping the switch, thus effecting the reversal of the carriage. The same action results upon the movement of the carriage in opposite direction. The spring 78 is coiled around the latch stem 79 and is confined in a bore 80 in the arm 81. The arm is also made with a recess for the reception of a button 82 which is carried by the stem 79. To produce the desired tension in the spring 78, the pin 76 is 1..

threaded in a holder 83 and a nut 84 is provided to hold adjustments of the pin.

The same identical actuating mechanism is provided for snapping the limit switch 63' at the completion of the backing up half of the cycle only instead of the supporting hanger 68' being fixed to the carriage, as is the hanger 68, it is mounted for swinging movement upon a pintle 85 so that it too may swing with the other parts of the actuating mechanism.

A locking pin 87 carried by the extension part 89 of the hanger 68' is arranged to seat in a recess 90 in the arm 86 to hold the hanger against respective movement about the pintle. By pulling out on the head of this pin against the influence of the spring the pin may be retracted from the recess 90 and thus leave the hanger free to swing about the pintle 85. In this manner the rod 65 may be held out of alignment with the trip rod 74. When the actuating mechanism for the limit switch on this side of the machine is thus moved out of the inactive operating position the carriage will feed rearwardly far enough to leave plenty of clearance to conveniently change the chucks or otherwise work on the tool end of the machine without interference.

A dual circuit is provided for the limit switches 63 and 63' and the same is hooked up as shown in Fig. 13 so that a starting switch A common to both and a stopping switch B common to both circuits may be used for controlling. The stopping switch B is for stopping the operation of the machine at any stage in its operation. The operator closing the starting switch A will energize the solenoid C and a like solenoid for the other circuit not shown. This in turn will close the magnetic switch D and a similar switch in the other circuit, which will operate the two driving motors 19 and 19'. When the carriage reaches its limit of movement in one direction and the limit switches affecting the solenoid E and a similar solenoid in the other circuit not shown, close the magnetic switch F and another like switch in the other circuit which reverses the motors 19 and 19' and feeds the tool carriage in opposite direction as well as reverses the rotation of the tools.

In both this case and my co-pending application the principal feature of the invention resides in equipping a machine tool, such as a multiple tool tapping machine with means for individually applying a retracting tension to the tools so that they will automatically withdraw from contact with the work immediately upon completion of the backing up half of the tapping cycle. In the present case I am showing a mechanical combination and co-operative relationship of parts for accomplishing the desired results and in my former case I have shown an electro-mechanical control for the same purpose.

Having thus described and shown an embodiment of this invention what I claim and desire to secure by Letters Patent of the United States is:

1. In a tapping machine, the combination of a plurality of rotary tapping tools, a tool head in which said tools are mounted for collective tapping operations, a feed screw for reciprocating the head for feeding the tools into and back them out of the work, means for driving the tools, means for reversing the feed screw and the tools, means for momentarily delaying the reverse drive to the tools until after the reversal of the feed screw has commenced and means operable as a result of the reversal of the feed screw and the momentary delay in the reverse drive to the tools for applying a retracting tension to the tools comprising a chuck assembly for each tool embodying in its construction a sleeve member, a collet having a limited axial movement therein and a spring coiled around the collet for imparting axial tension thereto inwardly of the sleeve.

2. In a tapping machine, the combination of a plurality of rotary tapping tools, a tool head in which said tools are mounted for collective tapping operations, a feed screw for reciprocating the head to feed the tools into and back them out of the work, gearing for driving the tools and the feed screw, means for reversing the drive to both the feed screw and the tools, a drive take off in said gearing for each tool, a clutch in said gearing common to all of said drive take offs for momentarily delaying the reverse drive to the tools until after reversal of the feed screw has commenced and means operable as a result of the reversal of the feed screw and the momentary delay in the reverse drive to the tools for automatically applying a retracting tension to the tools.

3. In a tapping machine, the combination of a plurality of rotary tapping tools, a tool head in which said tools are mounted for collective tapping operations, a feed screw for reciprocating the head to feed the tools into and back them out of the work, gearing for driving the tools and the feed screw, means for reversing the drive to both the feed screw and the tools, a drive take off in said gearing for each tool, a clutch in said gearing common to all of said drive take offs for momentarily delaying the reverse drive to the tools until after reversal of the feed screw has commenced and means operable as a result of the reversal of the feed screw and the momentary delay in the reverse drive to the tools for automatically applying a retracting tension to the tools comprising a chuck assembly for each tool embodying in its construction a sleeve member having an internal bore, a collet having limited axial movement in said bore, a spring in said bore behind said collet, and a spring coiled around the collet for imparting axial tension thereto inwardly of the sleeve.

4. In a multiple spindle machine tool, a reciprocal tool head, tools and driving spindles therefor carried by said head, a reversible motor reciprocal with said head for driving said spindles in opposite directions of rotation and for reciprocating said head, an axially yieldable mounting for each of said tools and a lost motion clutch in the drive for the spindles for momentarily declutching the drive for the spindles when said motor is reversed; whereby the reversed motion of the head will apply a retracting tension to the tools for individual application through their respective yieldable mountings.

5. The combination as set forth in claim 4 and in which the head is fed against a reversing switch for the motor to reverse the motor automatically.

6. The combination as set forth in claim 4 and in which the head operates a reversing switch for the motor at the limit of its movements in one direction and a stop switch for the motor at the limit of its movement in the opposite direction.

7. In a multiple spindle machine tool, a tool head mounted for reciprocation, tools and driving spindles therefor carried by said head, a feed screw for reciprocating said head, a reversible motor, gearing connecting the shaft of said motor in driving relation with said feed screw and said spindles and a lost motion clutch in said gearing for causing a momentary delay in the reversal of the drive to the spindles until after the reversal of the drive to the feed screw has commenced to move the head.

8. In a machine tool, the combination of a work holder, a plurality of tool heads mounted for movement to and from the work holder, tools carried by each head, a feed screw for each head, gearing in each head, a reversible motor for each head to drive the tools in each head and move said heads through their respective feed screws, a lost motion clutch for the gearing in each head to cause the reverse drive to the tools to be momentarily delayed in each head until the reverse drive to the feed screw has commenced, a spring device for each of the tools in the heads for applying a retracting tension on the tools upon reversal of the heads as a result of the delay in the reverse drive to the tools and means for reversing the motors automatically at the limit of the travel of heads in one direction and to cut out the motors at the limit of the travel of the heads in an opposite direction.

Signed at Rockford, in the county of Winnebago, and State of Illinois, this 24th day of July, 1929.

ARTHUR H. LYON.